April 15, 1952 — E. D. ORAM — 2,592,725
UPHOLSTERY TUFT FASTENER
Filed Jan. 5, 1951
Fig. 1.
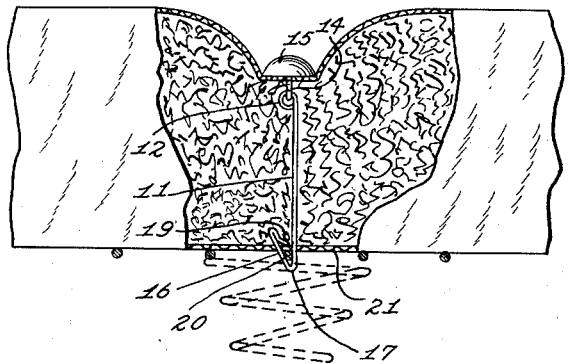
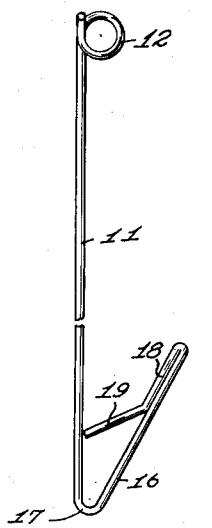
Fig. 2.
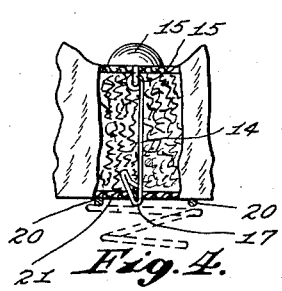
Fig. 4.
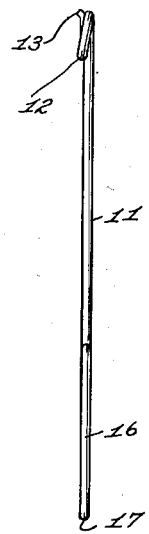
Fig. 3.
INVENTOR.
EDWARD D. ORAM
BY
McMorrow, Berman & Davidson
ATTORNEYS.

Patented Apr. 15, 1952

2,592,725

UNITED STATES PATENT OFFICE 2,592,725

UPHOLSTERY TUFT FASTENER

Edward D. Oram, Burbank, Calif.

Application January 5, 1951, Serial No. 204,641

2 Claims. (Cl. 24—152)

This invention relates to upholstery fasteners, and more particularly to an anchoring device for upholstery buttons or tufts.

A main object of the invention is to provide a novel and improved upholstery button or tuft fastener which is simple in construction, which is easy to insert through upholstery, and which securely anchors an upholstery tuft or button in its proper position.

A further object of the invention is to provide an improved fastener for upholstery buttons or tufts which is especially useful in replacing tufts or buttons that have become loosened or untied, such as on overstuffed furniture and the like, the fastener being very inexpensive to manufacture, being sturdy in construction, and being self locking by the mere insertion thereof into the upholstery, whereby no special tools or implements are required to insert the fastener and whereby the locking action of the fastener is increased by use or shifting of weight on the upholstery in which it is anchored.

Further objects and advantages of the invention will become apparent from the following description and claims and from the accompanying drawings, wherein:

Figure 1 is an end view of a fragmentary portion of an upholstered cushion, shown partly in cross-section, and illustrating the use of an improved tuft or button fastening device according to the present invention;

Figure 2 is an enlarged, side elevational view of the upholstery button or tuft fastener employed in Figure 1;

Figure 3 is a front elevational view of the fastener of Figures 1 and 2;

Figure 4 is a fragmentary view similar to Figure 1, but showing the hook portion of the fastener engaged with the burlap lining of the upholstered cushion, whereby the fastener is anchored with respect to said lining.

Referring to the drawings, and more particularly to Figures 2 and 3, the tuft fastener may comprise an elongated piece of light spring steel wire, the body of which is shown at 11. One end of the wire is formed with the loop or eye 12, as by forming a helical bend at the end of the wire 11. As shown, the end of the loop 12 is curved outwardly, as shown at 13, to facilitate the insertion of the securing eye 14 of an upholstery button 15 into the loop 12. The opposite end of the wire 11 is formed with the resilient hook 16, the bend of the hook, shown at 17, being of relatively small radius, whereby the hook defines a relatively sharp point. The end of the hook 16 is formed with a reversely directed arm comprising a first portion 18 which extends reversely along the end portion of the hook 16, as shown in Figure 2, and with a second portion 19 extending toward the main body portion 11 at an acute angle with respect thereto and also at an acute angle with the end portion of the hook 16. The end portion 19 is yieldable so that it may be readily deflected downwardly, as viewed in Figure 2, whereby it may interlock with a portion of the upholstery frame or lining when the fastener is inserted in the upholstery.

As shown in Figure 1, the fastener is employed by first engaging the button or tuft 15 with the loop 12 and then inserting the body of the fastener through the original aperture in the upholstery in which the tuft or button was secured. The aperture may be enlarged if desired by the use of a suitable implement having a sharpened point. In inserting the fastener, the body portion 11 is thrust through the aperture in the upholstery, the sharp point of the hook 16 engaging into the upholstery and being forced past the lining or frame of the upholstery. This may be accomplished by placing rapid pressure on the button or tuft 15, and forcing the hook 16 downwardly through and past the lining or frame of the upholstery and then permitting the hook 16 to move upwardly from its position below the lining or frame, whereby the hook 16 will engage behind the frame or lining of the upholstery as a result of its localized compression thereon.

A shown in Figure 1, the hook 16 may engage with one of the supporting wires 20, the wire 20 being lockingly received inside the hook 16 and being held in the hook by the resilient arm portion 19. Alternatively, the hook may be engaged with the burlap lining 21 in the manner shown in Figure 4, in the event that the fastener is inserted between the locations of adjacent supporting wires 20, 20, as shown in Figure 4. It will be readily apparent that the fastener may be anchored regardless of the presence or absence of supporting wires or frame elements, such as the elements 20.

It will be readily apparent that the improved fastener above described may be employed to replace a tuft or button 15 which has become loosened without requiring the upholstery to be dismantled and without requiring the use of special upholstery tools. It will be further apparent that the fastener lockingly engages with the supporting frame or lining of the upholstery and cannot be readily loosened or detached from the upholstery after it has been inserted. It will be further apparent that the resilient locking arm portion 19 snaps past the element of the upholstery lining or supporting frame with which it engages responsive to the upward movement of hook 16 and thereafter anchors the fastener in position.

While a specific embodiment of an improved upholstery button or tuft fastener has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tuft fastener for upholstery comprising a wire rod, an eye at one end of said wire rod adapted to be engaged with a tuft button, a resilient hook at the other end of said wire rod adapted to lockingly engage in the body of an article of upholstery when the rod is thrust into said body, the bend of said hook being of small radius, whereby the hook defines a relatively sharp point, and a reversely directed resilient arm at the end of said hook, said arm extending toward said rod at an acute angle thereto and being also at an acute angle to the end portion of said hook.

2. A tuft fastener for upholstery comprising a wire rod, an eye at one end of said wire rod adapted to be engaged with a tuft button, a resilient hook at the other end of said rod adapted to lockingly engage in the body of an article of upholstery when the rod is thrust into said body, the bend of said hook being of a small radius, whereby the hook defines a relatively sharp point, and a reversely directed resilient arm at the end of said hook, said arm having a first portion extending reversely along the end portion of the hook and a second portion extending toward said rod at an acute angle thereto and being also at an acute angle to the end portion of said hook.

EDWARD D. ORAM.

REFERENCES CITED

The following references are of record in the file of this patent:

UNITED STATES PATENTS

| Number | Name | Date |
| --- | --- | --- |
| 1,702,127 | Morgana et al. | Feb. 12, 1929 |
| 1,913,555 | Lyle | June 13, 1933 |